UNITED STATES PATENT OFFICE.

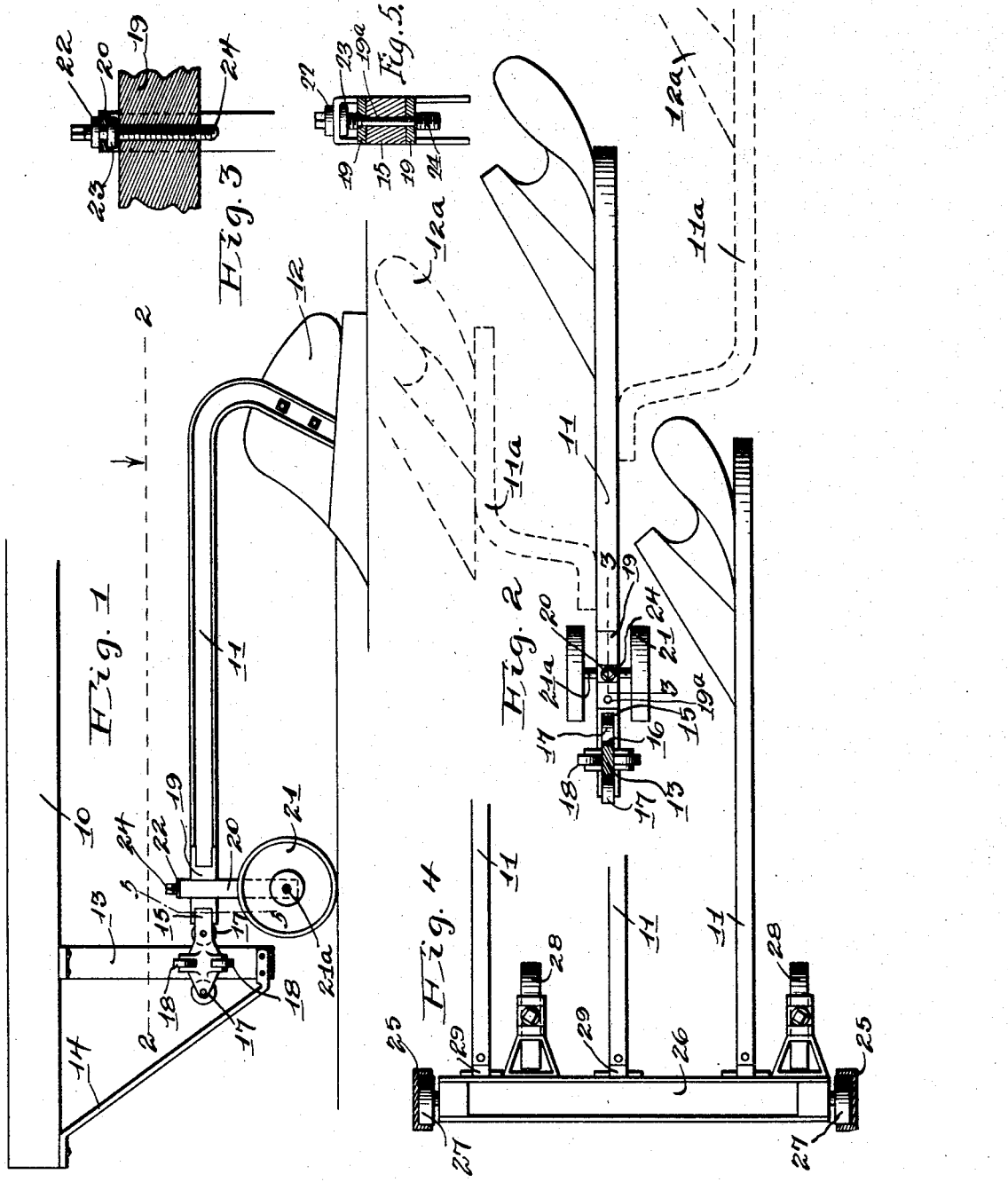

LESLIE S. HACKNEY, OF ST. PAUL, MINNESOTA.

PLOW-HITCH.

1,186,309.  Specification of Letters Patent.  Patented June 6, 1916.

Application filed August 25, 1913. Serial No. 786,439.

*To all whom it may concern:*

Be it known that I, LESLIE S. HACKNEY, a citizen of the United States, residing at St. Paul, in the county of Ramsey and State of Minnesota, have invented an Improved Plow-Hitch, of which the following is a specification.

My invention relates to an improved plow hitch. Its object is to provide a device of this class adapted to permit the automatic vertical adjustment of a plow beam by gaging devices in operative connection therewith.

In the drawings, Figure 1 illustrates a portion of a draft frame and a plow attached thereto by means of my improved device; Fig. 2 is a sectional view taken on the line 2—2 of Fig. 1; Fig. 3 is a detail sectional view taken on the line 3—3 of Fig. 2; Fig. 4 is a view similar to Fig. 2 illustrating a modified form of my invention, and Fig. 5 is a vertical sectional view in detail taken on the line 5—5 of Fig. 1.

Referring to the drawings, I have used the reference numeral 10 to indicate a draft frame, 11 a plow beam and 12 a plow body on said beam.

The numeral 12ª designates plow bodies which may be secured to the beam 11 by means of branch beams 11ª, as indicated in dotted lines in Fig. 2.

The depending bar 13, secured at its upper end to the draft frame 10 and braced by suitable rods 14 attached to said frame, forms a vertical slide or support for the carriage 15, which is formed with an opening 16 to receive the bar 13 and is provided with anti-friction rollers 17 adapted to bear against the edges of said bar loosely so as to allow a slight vertical tilting movement of said carriage with respect to the bar 13. A set of rollers 18, snugly fitting on each side of the carriage 15, is furnished to provide a non-frictional bearing at the sides of the bar 13 and prevent any horizontal tipping movement of the carriage upon said bar. The carriage is also provided with a coupling link 19 pivotally secured thereto by a pintle 19ª, said coupling link being adapted to receive and rigidly hold the forward end of the plow beam 11. A fork 20, in which the shaft 21ª, supporting the gage wheels 21, is journaled, slides vertically in the grooved sides of the coupling link 19 and the top of said fork 20 is engaged between collars 22 and 23 on the adjusting screw 24 which is threaded vertically in said link. In use, the screw 24 is set to obtain the desired adjustment of the gage wheels and the carriage 15 rises and falls on the bar 13 in response to the movements of said wheels.

In my modified form, a beam, having two depending channel branches 25, is substituted for the bar 13 of my preferred form and the carriage consists of a bar 26 having rollers 27 at its ends adapted to travel in the channeled branches 25, said bar being provided with adjustable gage wheels 28, similar to those above described, and being also supplied with connecting lugs 29 to which the plow beams 11 are attached. The operation of the modified form is identical with that of the preferred form.

Having described my invention, what I claim as new and desire to protect by Letters Patent, is:

1. In a plow hitch, the combination with a draft frame, of a support depending from and braced with respect to said frame, a carriage slidable vertically on said support, anti-friction rollers on the carriage, said rollers being arranged to permit longitudinal and prevent transverse tipping movements of said carriage, a plow beam carrying a plow body pivoted horizontally on said carriage and a gaging device on said plow beam.

2. In a plow hitch, the combination with a draft frame, of a bar secured to and depending from the frame, said bar being rectangular in cross-section and having its greater dimension arranged longitudinally with respect to the frame, a carriage slidable vertically on said bar, a connecting link pivoted horizontally on said carriage, a roller at each end of the carriage adapted to travel on opposite edges of said bar, said rollers permitting longitudinal tipping movements of said carriage, a second set of rollers on the carriage adapted to travel on opposite sides of said bar, said rollers being spaced to prevent transverse tipping movements of said carriage, a gaging device on said connecting link, a plow beam attached to said link and a plow body on said beam.

In testimony whereof, I have signed my name to this specification in the presence of two subscribing witnesses.

LESLIE S. HACKNEY.

Witnesses:
F. C. CASWELL,
LOUIS JOHNSON.